(12) United States Patent
Shen et al.

(10) Patent No.: US 11,532,992 B2
(45) Date of Patent: Dec. 20, 2022

(54) SYNCHRONOUS RECTIFIER CONTROLLER AND CONTROL METHOD THEREOF

(71) Applicant: ARK SEMICONDUCTOR CORP. LTD., Shenzhen (CN)

(72) Inventors: Yi-Lun Shen, Shenzhen (CN); Yu-Yun Huang, Shenzhen (CN); Fong-Cheng Yang, Shenzhen (CN)

(73) Assignee: ARK SEMICONDUCTOR CORP. LTD., Shenzhen (CN)

( * ) Notice: Subject to any disclaimer, the term of this patent is extended or adjusted under 35 U.S.C. 154(b) by 151 days.

(21) Appl. No.: 17/206,946

(22) Filed: Mar. 19, 2021

(65) Prior Publication Data

US 2021/0336546 A1  Oct. 28, 2021

(30) Foreign Application Priority Data

Apr. 28, 2020 (CN) .......................... 202010348396.4

(51) Int. Cl.
*H02M 3/335* (2006.01)

(52) U.S. Cl.
CPC .............................. *H02M 3/33592* (2013.01)

(58) Field of Classification Search
None
See application file for complete search history.

(56) References Cited

U.S. PATENT DOCUMENTS

| 9,755,423 | B2* | 9/2017 | Sandner | ............... H02H 7/1252 |
|---|---|---|---|---|
| 10,168,718 | B1 | 1/2019 | Kuo et al. | |
| 10,673,344 | B2* | 6/2020 | Wang | ............... H02M 3/33592 |
| 2015/0229219 | A1 | 8/2015 | Choi | |
| 2019/0097521 | A1 | 3/2019 | Tao et al. | |

FOREIGN PATENT DOCUMENTS

| CN | 103887980 A | 6/2014 |
|---|---|---|
| CN | 106208720 A | 12/2016 |
| CN | 206117515 U | 4/2017 |
| CN | 107968569 A | 4/2018 |
| CN | 107979289 A | 5/2018 |
| CN | 104917362 B | 11/2018 |
| CN | 109713921 A | 5/2019 |
| CN | 109995241 A | 7/2019 |
| CN | 110224619 A | 9/2019 |
| CN | 110896283 A | 3/2020 |
| TW | 200929827 A | 7/2009 |
| TW | M-445302 U | 1/2013 |
| TW | M-571619 U | 12/2018 |

OTHER PUBLICATIONS

Office Action dated Jul. 7, 2021 in TW Application No. 109125953, 9 pages.

* cited by examiner

*Primary Examiner* — Jeffrey A Gblende
(74) *Attorney, Agent, or Firm* — Muncy, Geissler, Olds & Lowe, P.C.

(57) ABSTRACT

A synchronous rectifier controller for controlling a rectifier switch is disclosed. The synchronous rectifier controller includes a fully-ON controller and a regulator. Capable of being triggered by a channel voltage of the rectifier switch, the fully-ON controller turns the rectifier switch fully ON for a fully-ON time in view of a predetermined condition. The regulator, disabled during the fully-ON time and enabled after the fully-ON time, turns the rectifier switch ON to regulate the channel voltage within a predetermined voltage range.

20 Claims, 4 Drawing Sheets

SYNCHRONOUS RECTIFIER CONTROLLER AND CONTROL METHOD THEREOF

BACKGROUND OF THE INVENTION

Technical Field

The present disclosure relates generally to synchronous rectification in a secondary side of a power supply, and more particularly to synchronous rectifier controller and control method thereof applicable to a secondary side of a flyback power converter.

Related Art

Power converters supply power with accurately-stabilized voltage or current. Beside the requirement of stable voltage and current, the conversion efficiency of power converters is an important factor that power supply manufactures concern. Persons skilled in the art always look for ways to increase conversion efficiency for more advanced power supplies.

Conventional flyback switching mode power supplies have a transformer to isolate a primary side from a secondary side. Switching of a power switch in the primary side varies the voltage across a primary winding in the transformer of the primary side, and the secondary winding of the transformer, in the secondary side, inductively generates alternating voltage/current, rectification of which supplies power to a load in the secondary side.

The simplest way to perform the rectification in the secondary side is to connect a rectifier diode between the secondary winding and the load. The rectifier diode unfortunately and constantly consumes considerable power when it conducts large current to the load, because of the unavoidable forward voltage of the rectifier diode. To increase power conversion efficiency or to reduce the power consumption caused by rectification, it is a trend to replace the rectifier diode with a rectifier switch, and this technology is commonly known as synchronous rectification. Timing of turning ON and OFF the rectifier switch is very key, and it concerns not only power conversion efficiency but also safety issues of the power supply. If the rectifier switch is turned ON at an inappropriate moment, power conversion efficiency suffers and, in some extreme cases, the power supply explodes, endangering its user and environment.

BRIEF DESCRIPTION OF THE DRAWINGS

The present disclosure can be more fully understood by reading the following detailed description of the embodiment, with reference made to the accompanying drawings as follows.

SUMMARY OF THE INVENTION

Figure 1:
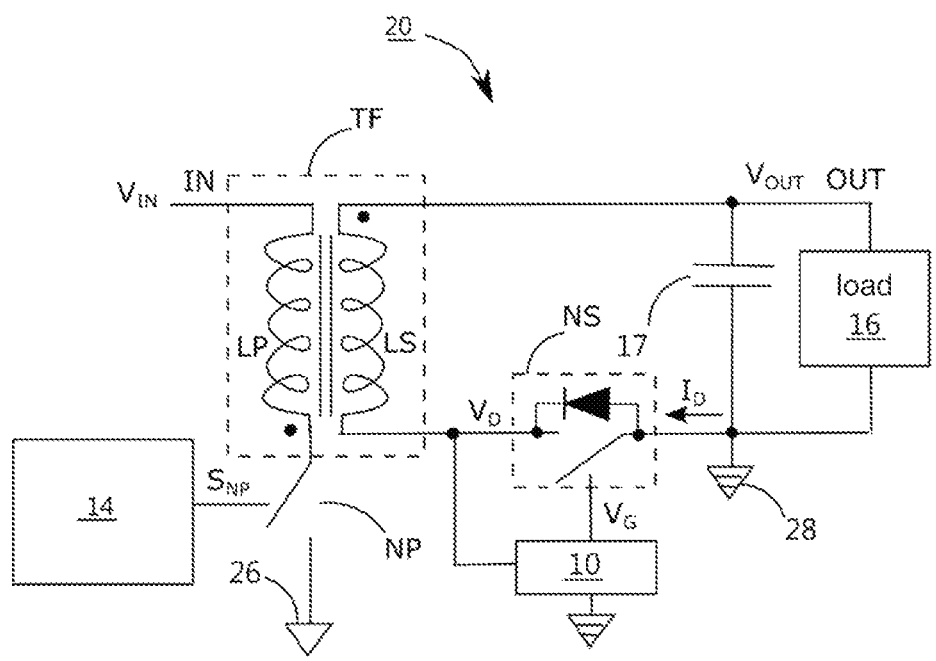
FIG. 1. demonstrates flyback switching mode power converter according to embodiments of the present disclosure.

The embodiment of the present disclosure discloses a synchronous rectifier controller for controlling a rectifier switch. The synchronous rectifier controller comprising a fully-ON controller and a regulator. The fully-ON controller can be triggered by a channel voltage of the rectifier switch to turn the rectifier switch fully ON for a fully-ON time based on a predetermined criterion. The regulator is disabled during the fully-ON time and is enabled after the fully-ON time, to turn the rectifier switch partially ON and regulate the channel voltage within a predetermined voltage range. A performance record is generated when the regulator regulates the channel voltage, and the fully-ON controller adjusts the predetermined criterion in response to the performance record.

Another embodiment of the present disclosure discloses a control method in used of a synchronous rectifier controller controlling a rectifier switch. The control method comprising turning the rectifier switch fully ON for a fully-ON time, wherein the fully-ON time is determined based on a predetermined criterion; regulating, after the fully-ON time, a channel voltage of the rectifier switch within a predetermined voltage range to generate a performance record; turning the rectifier switch OFF when the channel voltage meets an OFF criterion; and adjusting the predetermined criterion in response to the performance record, so as to make the performance record approach a predetermined target.

DETAILED DESCRIPTION OF THE INVENTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Non-limiting and non-exhaustive embodiments of the present disclosure are described with reference to the figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

Reference throughout this specification to "one embodiment", "an embodiment", "one example" or "an example" means that a particular feature, structure, or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

According to embodiments of the present disclosure, the ON time when a rectifier switch in a secondary side is turned ON is divided into two parts: fully-ON time and regulation time. During the fully-ON time, the gate of the rectifier switch is supplied with a constant high voltage, so the rectifier switch is turned fully ON. During the regulation time following the fully-ON time, the rectifier switch is turned partially ON, to regulate a channel voltage of the rectifier switch within predetermined voltage range. The duration of the fully-ON time is determined by a predetermined criterion, which is adaptively adjusted in response to a performance record generated during the regulation time, so the performance record will become closer to a predetermined target over time in the future.

The fully-ON time, occurring ahead of the regulation time, offers a low ON resistance to the rectifier switch to conduct current to a load, reducing power consumption and improving power conversion efficiency.

During the regulation time when the rectifier switch is turned partially ON and its channel voltage is regulated within the predetermined voltage range, the gate voltage of the rectifier switch is relatively low in comparison with that during the fully-ON time. In the moment decided to turn the rectifier switch OFF, the rectifier switch could be easily and promptly turned OFF due to the relatively-low gate voltage during the regulation time. Besides, the regulation time also offers a relatively-high ON resistance to the rectifier switch, which could damper any reverse current if the rectifier switch accidentally turns OFF too late.

The predetermined criterion is adjusted in response to a performance record generated during the regulation time, to adaptively modify the duration of the fully-ON time in the future. Therefore, the fully-ON time will be adaptively tuned to be as long as possible, taking the advantage of higher power conversion efficiency.

In this specification, a switch is turned ON when providing a short circuit between two nodes of the switch, and OFF when it provides an open circuit between the two nodes. For example, a MOS transistor is turned ON w % ben its source and drain short to each other, and it is turned OFF when its source and drain are seemingly isolated from each other.

FIG. 1 demonstrates flyback switching mode power converter 20 according to embodiments of the present disclosure. Flyback switching mode power converter 20 has in the primary side input power line IN, input ground 26, power controller 14, primary winding LP, and power switch NP, all of which are connected as shown in FIG. 1. Flyback switching mode power converter 20 has in the secondary side output power line OUT, output ground 28, synchronous rectifier controller 10, secondary winding LS, and rectifier switch NS, connection of which is demonstrated in FIG. 1. Transformer TF includes, but is not limited to include, primary winding LP and secondary winding LS, inductively coupled to each other, and positioned in the primary and secondary sides respectively.

Power controller 14 provides control signal $S_{NP}$ to control power switch NP to alter the current through primary winding LP and the voltage across primary winding LP. Due to the inductive coupling, secondary winding LS generates alternating voltage or current, which is rectified by rectifier switch NS to generate suitable output voltage $V_{OUT}$ powering load 16. When turned ON, rectifier switch NS provides a conductive channel shorting output ground 28 to secondary winding LS. For example, rectifier switch NS is a NMOS transistor with a drain connected to secondary winding LS, a source to output ground 28, and a gate controlled by synchronous rectifier controller 10. Channel voltage $V_D$ at the joint between rectifier switch NS and secondary winding LS is capable of representing the voltage drop across the conductive channel that rectifier switch NS provides. In response to channel voltage $V_D$, synchronous rectifier controller 10 provides gate signal $V_G$ to control rectifier switch NS. Generally speaking, synchronous rectifier controller 10 relies on the information from channel voltage $V_D$ to determine whether to turn rectifier switch NS ON or OFF and how it is turned ON.

Figure 2:
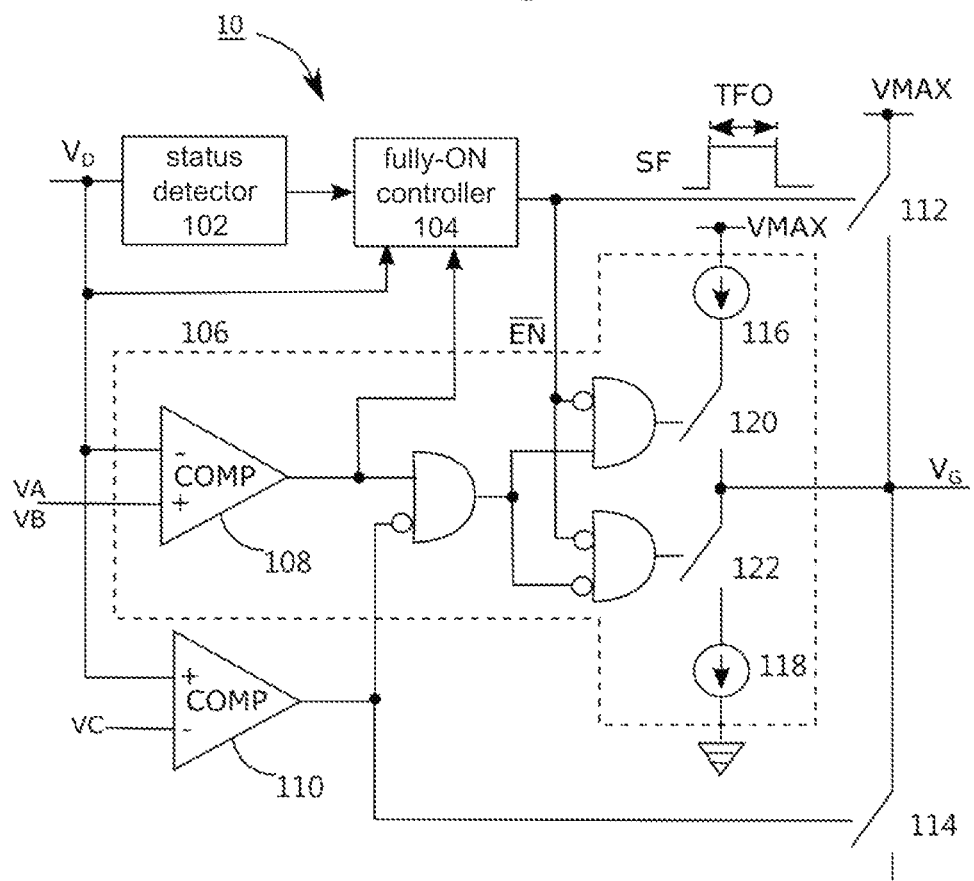
FIG. 2. shows synchronous rectifier controller in FIG. 1.

FIG. 2 shows synchronous rectifier controller 10 in FIG. 1, including status detector 102, fully-ON controller 104, regulator 106, OFF controller 110, and switches 112 and 114.

Status detector 102 determines whether power switch NP in the primary side is just turned OFF, based on channel voltage $V_D$, so as to trigger fully-ON controller 104. For example, status detector 102 detects the falling rate of channel voltage $V_D$. If the falling rate exceeds a predetermined value and channel voltage $V_D$ becomes negative, it is determined that power switch NP was just turned OFF, and status detector 102 accordingly signals fully-ON controller 104.

Fully-ON controller 104, triggered by status detector 102, generates pulse SF to turn ON switch 112, which pulls the voltage of gate signal $V_G$ up to a constant voltage VMAX, turning rectifier switch NS fully ON. This constant voltage VMAX, for example, could be the maximum voltage that the gate of rectifier switch NS can sustain. But the present disclosure is not limited to. This constant voltage VMAX could be any constant voltage that is capable of keeping rectifier switch NS turned ON. The pulse width of pulse SF is fully-ON time TFO, during which fully-ON controller 104 turns rectifier switch NS fully ON.

Regulator 106 includes comparator 108 with hysteresis, several logic gates, current sources 116 and 118, switches 120 and 122, connection of which is shown in FIG. 2. During fully-ON time TFO, regulator 106 is disenabled, and it does not drive gate signal $V_G$, because switches 120 and 122 both are OFF, making output of regulator 106 high-impedance. After fully-ON time TFO or the end of pulse SF, regulator 106 is enabled, not only to turn rectifier switch NS partially ON, but also to regulate channel voltage $V_D$ at about a negative reference voltage $V_{REF}$, or to keep channel voltage $V_D$ substantially between boundary voltages VA and VB. For examples not limiting the scope of the present disclosure, negative reference voltage $V_{REF}$ is −0.3V, and boundary voltages VA and VB are −0.25V and −0.35V, respectively. Comparator 108 with hysteresis compares channel voltage $V_D$ with one of boundary voltages VA and VB based on the output of comparator 108. When its output is "1" in logic, comparator 108 selects boundary voltage VA to compare, and w % ben its output is "0" in logic, it selects boundary voltage VB. When channel voltage $V_D$ exceeds boundary voltage VA, comparator 108 turns its output "0" in logic, switch 120 OFF and switch 122 ON, so current source 118 starts pulling down gate signal $V_G$. The lower gate signal $V_G$, the higher impedance of the conductive channel provided by rectifier switch NS, the more negative channel voltage $V_D$. Therefore, when current source 118 pulls gate signal $V_G$ downward, channel voltage $V_D$ in response drops or goes downward. Once channel voltage $V_D$ falls below boundary voltage VB, comparator 108 outputs "1" in logic, switch 120 ON and switch 122 OFF, so current source 116 starts pulling gate signal $V_G$ up, and channel voltage $V_D$ in response rises or goes upward. Channel voltage $V_D$ under the control of regulator 106 might temporarily go outside the range between boundary voltages VA and VB, but it will soon bounce back after it touches any one of boundary voltages VA and VB. According, regulator 106 keeps channel voltage $V_D$ bouncing substantially between boundary voltages VA and VB.

OFF controller 110, exemplified by a comparator in FIG. 2, detects whether channel voltage $V_D$ meets an OFF criterion. As to the example shown in FIG. 2, this OFF criterion is whether channel voltage $V_D$ exceeds predetermined voltage VC, which is for example 0V. If channel voltage $V_D$ exceeds predetermined voltage VC, OFF controller 110 turns switch 114 OFF, forcing gate signal $V_G$ to be 0V, so as to turn rectifier switch NS OFF.

Figure 3:
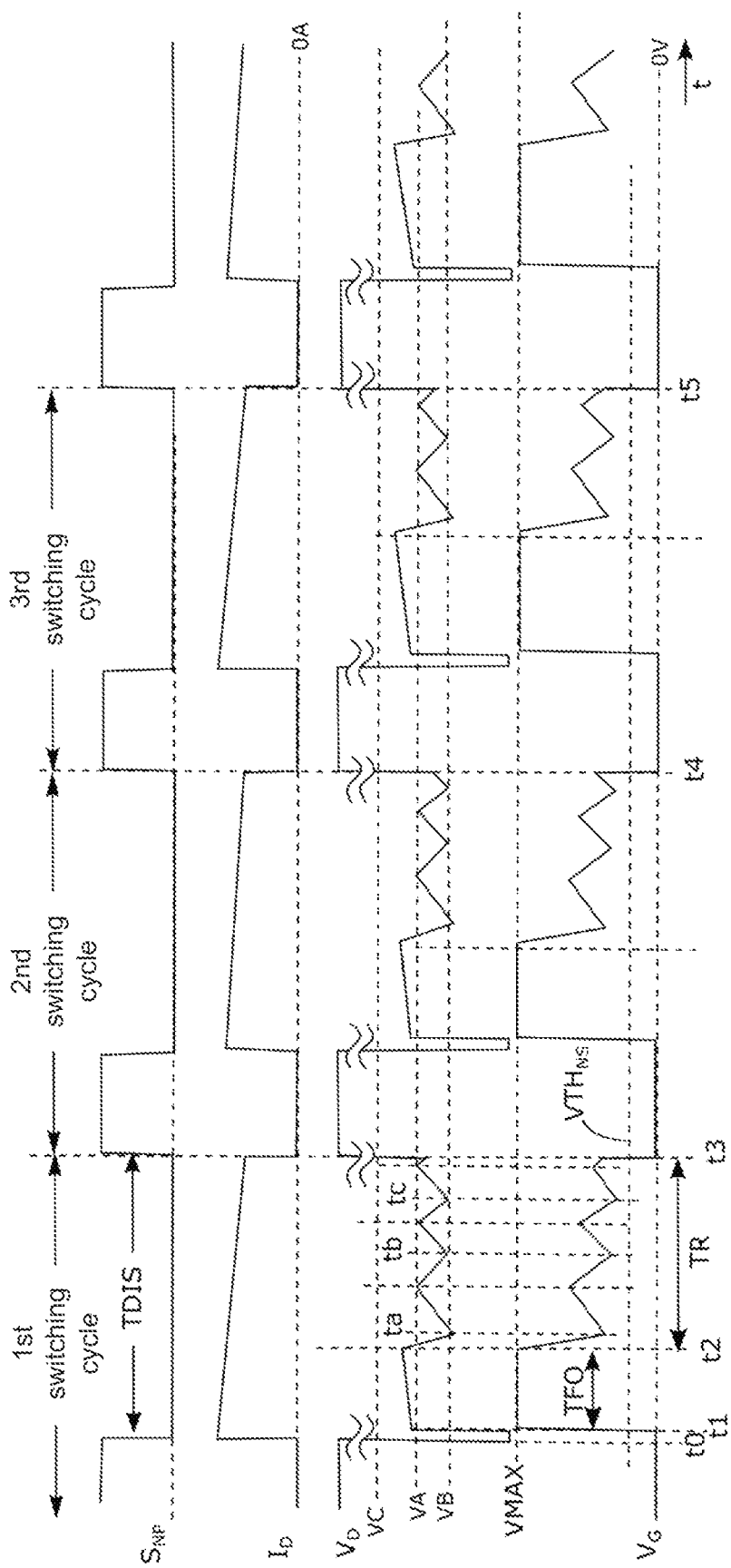
FIG. 3 demonstrates waveforms of control signal, channel current conducted by rectifier switch, channel voltage and gate signal around three consecutive switching cycles.

FIG. 3 demonstrates waveforms of control signal $S_{NP}$, channel current ID conducted by rectifier switch NS, channel voltage $V_D$ and gate signal $V_G$ around three consecutive switching cycles.

At moment t0 within the $1^{st}$ switching cycle in FIG. 3, power switch NP is turned OFF, and channel current ID inductively peaks. Channel current ID gradually declines while it continuously charges output voltage $V_{OUT}$. At moment t0, rectifier switch NS is OFF, and channel current ID instantly goes through the parasitic diode within rectifier switch NS, causing channel voltage $V_D$ to have a sudden drop from a positive value to −0.7V or less voltage, as shown in FIG. 3.

Soon after moment t0, status detector 102 acknowledges that the falling rate of channel voltage $V_D$ is high enough to indicate the power switch NP was just turned OFF. After a signal propagation delay, status detector 102 triggers fully-ON controller 104 to start turning rectifier switch NS fully ON at moment t1, the beginning of fully-ON time TFO. Fully-ON controller 104 ends fully-ON time TFO at moment t2. During fully-ON time TFO, gate signal $V_G$ is fixed at constant voltage VMAX, which should be high enough to make channel resistance of rectifier switch NS as low as possible.

After moment t2, fully-ON controller 104 stops controlling rectifier switch NS, and regulator 106 takes over. Regulator 106 regulates channel voltage $V_D$ to make it bounce about between boundary voltages VA and VB. As shown in FIG. 3, since moment t2, channel voltage $V_D$ goes up and down, and gate signal $V_G$ does too, until moment 3. The period from moment t2 to moment t3 when regulator 106 controls rectifier switch NS is referred to as regulation time TR. Please note that during regulation time TR gate signal $V_G$ is always higher than the threshold voltage $VTH_{NS}$ of rectifier switch NS. Therefore, regulator 106 turns rectifier switch NS ON, but rectifier switch NS is only partially ON because gate signal $V_G$ is lower than constant voltage VMAX used to turn rectifier switch NS fully ON during fully-ON time TFO.

Control signal $S_{NP}$ turns power switch NP ON at moment t3 to end the $1^{st}$ switching cycle and to begin the $2^{nd}$ switching cycle. Meanwhile, due to the inductive coupling inside transformer TF, channel current ID suddenly drops toward negative, causing channel voltage $V_D$ turning into positive. OFF controller 110 in FIG. 2, as soon as it detects the positive of channel voltage $V_D$, starts turning rectifier switch NS OFF at moment 13.

Fully-ON controller 104 in FIG. 2 adjusts a predetermined criterion in response to a performance record during regulation time TR when regulator 106 is enabled, so as to adjust the duration of fully-ON time TFO in the next switching cycle. The duration of fully-ON time TFO is adaptively adjusted in order to make performance records in the coming switching cycles approach a predetermined target. The performance record generated in each switching cycle in FIG. 2, for example, is intersection number NC counting the number of times channel voltage $V_D$ touches boundary voltage VB, and the predetermined target is predetermined number NSET. In FIG. 2, fully-ON controller 104 receives the output of comparator 108 to count the number of times channel voltage $V_D$ touches boundary voltage VB and to generate intersection number NC. For other embodiments of the present disclosure, the performance record is the intersection number counting the number of times channel voltage $V_D$ touches boundary voltage VA, or the total number of times channel voltage $V_D$ touches boundary voltage VA or VB. For some other embodiments of the present disclosure, the performance record could be any outcome generated during regulation time TR.

Please refer to FIG. 3. During regulation time TR, fully-ON controller 104 records intersection number NC counting the number of times channel voltage $V_D$ touches boundary voltage VB, to accordingly tune the duration of fully-ON time TFO in the next switching cycle. For example, at moment t3, it is obviously shown in FIG. 3 that intersection number NC is 3 because channel voltage $V_D$ touches boundary voltage VB three times at moments ta, tb and tc respectively. Since intersection number NC, currently being 3, is larger than predetermined number NSET, presumed to be 2, fully-ON controller 104 adjusts the predetermined criterion used for controlling the duration of fully-ON time TFO, making the fully-ON time TFO on the $2^{nd}$ switching cycle longer and the regulation time TR shorter. At moment t4, the end of the $2^{nd}$ switching cycle, apparently intersection number NC in regulation time TR is still 3 according to what the $2^{nd}$ switching cycle in FIG. 3 shows, so fully-ON controller 104 adjusts again the predetermined criterion, to lengthen fully-ON time TFO and shorten regulation time TR in the $3^{rd}$ switching cycle. At moment t5, the end of the $3^{rd}$ switching cycle, apparently intersection number NC in regulation time TR becomes 2 equal to predetermined number NSET, so fully-ON controller 104 keeps the predetermined criterion unchanged, making fully-ON time TFO and regulation time TR in the next switching cycle substantially about the same.

According to embodiments of the present disclosure, the predetermined criterion that fully-ON controller 104 controls fully-ON time TFO could be that fully-ON time TFO ends when channel voltage $V_D$ exceeds negative reference voltage $V_{REF2}$. It is expected that the higher reference voltage $V_{REF2}$ the longer fully-ON time TFO. Some embodiments increase reference voltage $V_{REF2}$ if intersection number NC that fully-ON controller 104 records is larger than predetermined number NSET, so fully-ON time TFO in the next switching cycle could be lengthened. Accordingly, fully-ON time TFO is in association with channel voltage $V_D$ and reference voltage $V_{REF2}$, and fully-ON controller 104 adjusts reference voltage $V_{REF2}$ in response to the performance record during regulation time TR.

According to embodiments of the present disclosure, the predetermined criterion that fully-ON controller 104 controls fully-ON time TFO could be that fully-ON time TFO for the present switching cycle ends when its duration is about demagnetization time TDIS in the previous switching cycle times ratio K, a factor between 0 and 1. Demagnetization time TDIS refers to about the period of time when channel current ID is positive. It is expected that the higher ratio K the longer fully-ON time TFO. Some embodiments increase ratio K if intersection number NC that fully-ON controller 104 records is larger than predetermined number NSET, so fully-ON time TFO in the next switching cycle could be lengthened. Accordingly, fully-ON time TFO is in association with demagnetization time TDIS and ratio K, and fully-ON controller 104 adjusts ratio K in response to the performance record during regulation time TR.

Figure 4:
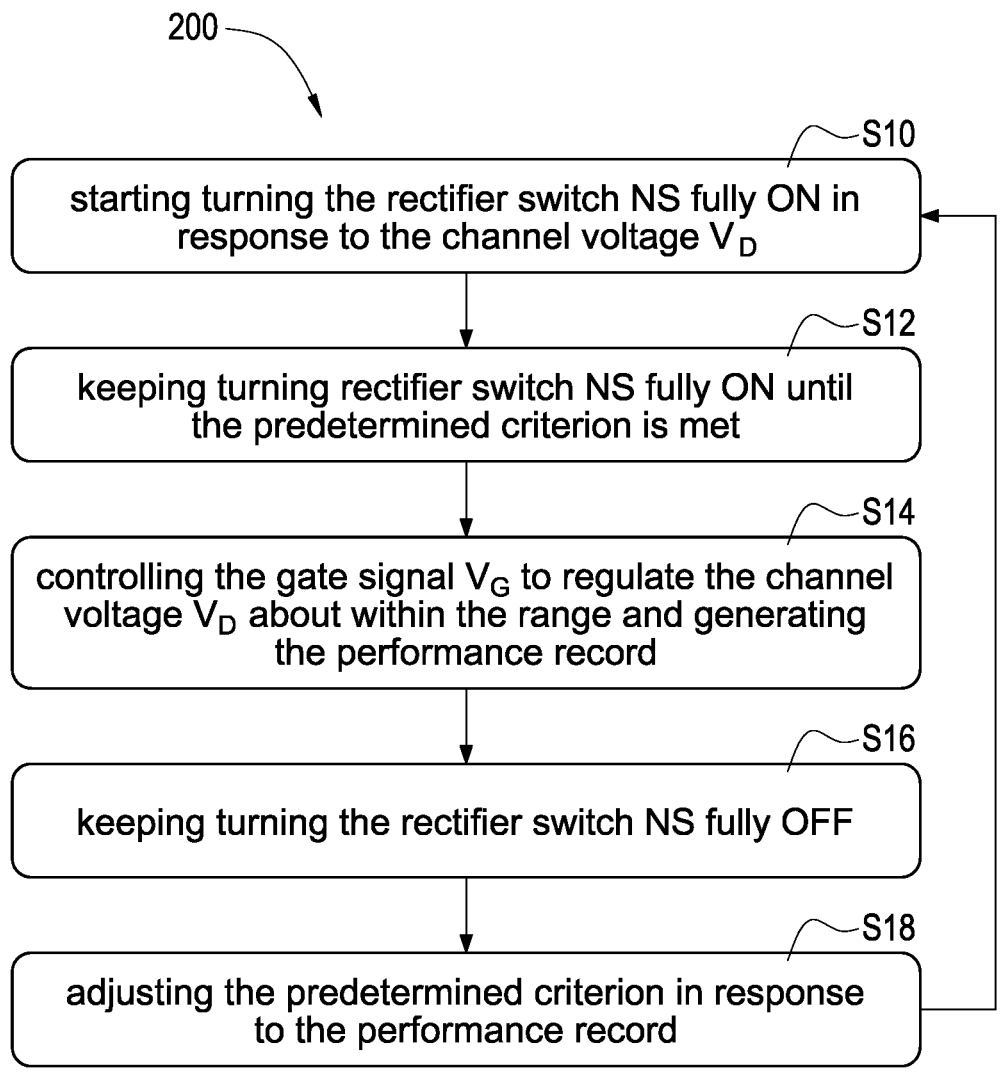
FIG. 4 demonstrates control method in use of synchronous rectifier controller.

FIG. 4 demonstrates control method 200 in use of synchronous rectifier controller 10.

In step S10, status detector 102 detects the falling rate of channel voltage $V_D$ to determine whether power switch NP in the primary side was just turned OFF, and accordingly signals fully-ON controller 104 to start turning rectifier switch NS fully ON, the beginning of fully-ON time TFO.

In step S12, fully-ON controller 104 keeps turning rectifier switch NS fully ON until a predetermined criterion is met. Fully-ON time TFO ends when the predetermined criterion is met.

In step S14, regulator 106 controls gate signal $V_G$ to regulate channel voltage $V_D$ about within the range between boundary voltages VA and VB. At the same time, fully-ON controller 104 generates performance record during regulation time TR, the period of time when regulator 106 is in charge of regulating channel voltage $V_D$. The performance record in some embodiments of the present disclosure is intersection number NC counting the number of times channel voltage $V_D$ touches boundary voltage VB during regulation time TR.

In step S16, since channel voltage $V_D$ is found positive, OFF controller 110 takes over to keep gate signal $V_G$ 0V, forcing and keeping rectifier switch NS turned OFF.

In step S18, fully-ON controller 104 adjusts the predetermined criterion used in S12 in response to the performance record generated during regulation time TR, so as to make the performance record approach a predetermined target.

Figure 5:
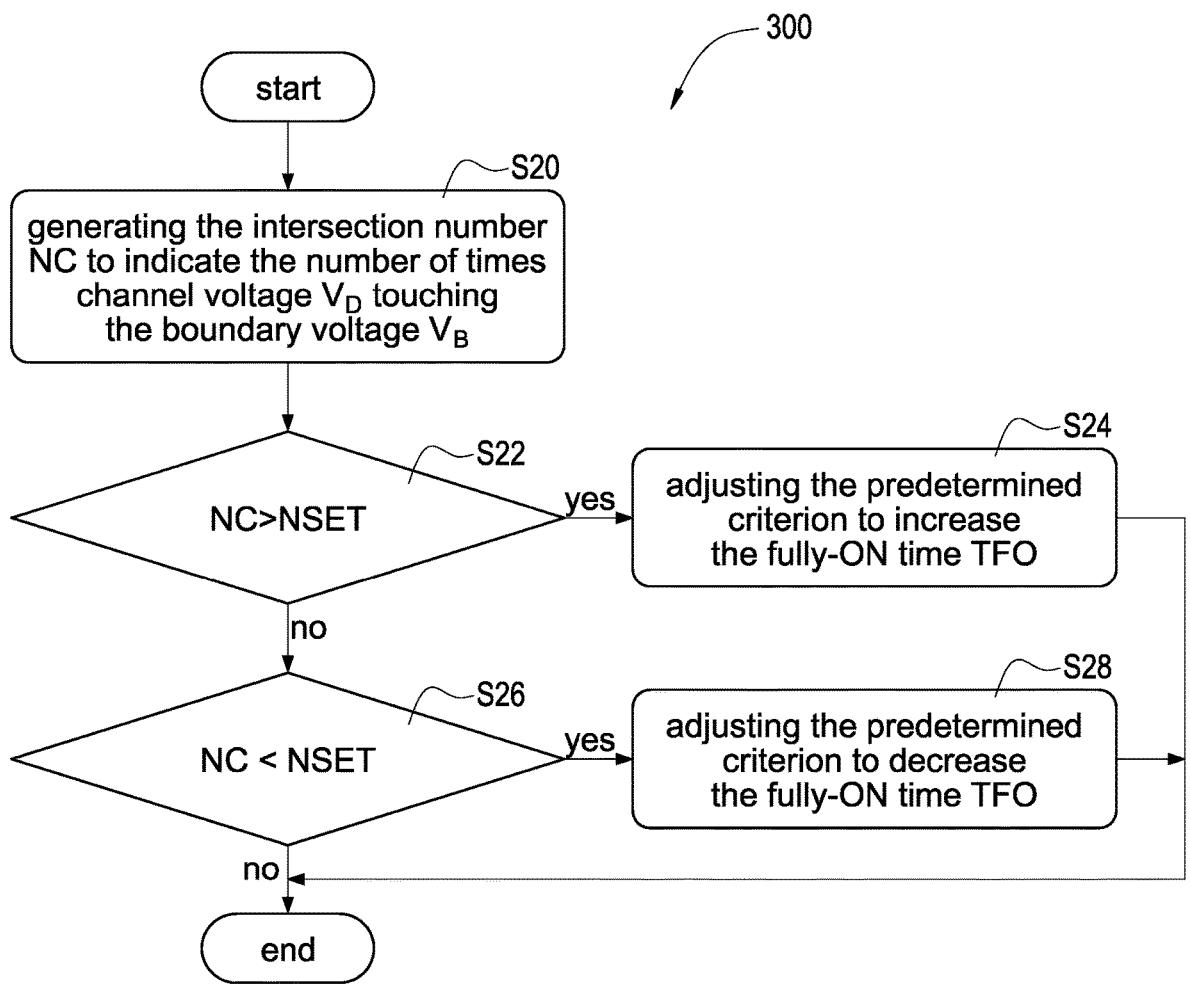
FIG. 5 demonstrates control method in use of fully-on controller.

FIG. 5 demonstrates control method 300 in use of fully-ON controller 104.

As of step S20, fully-ON controller 104 generates intersection number NC during regulation time TR.

Steps S22 and S26 compares intersection number NC with predetermined number NSET.

When intersection number NC exceeds predetermined number NSET, step S24 adjusts the predetermined criterion used in step S12 to increase fully-ON time TFO in the next switching cycle. As fully-ON time TFO is expected to become longer in the next switching cycle, intersection number NC is prone to decrease.

When intersection number NC is smaller than predetermined number NSET, step S28 adjusts the predetermined criterion used in step S12 to decrease fully-ON time TFO in the next switching cycle. Intersection number NC in the next switching cycle is prone to increase, accordingly.

Both steps S24 and S28 make the intersection number NC in the next switching cycle approach predetermined number NSET.

Based on the aforementioned teaching, synchronous rectifier controller 10 adaptively modifies the duration of fully-ON time, to keep intersection number NC about equal to predetermined number NSET. In other words, if regulation time TR of the present switching cycle seems too short/long, fully-ON time TFO in the next switching cycle is adaptively shortened/lengthened.

Channel current ID continuously decreases over time during demagnetization time TDIS. Having fully-ON time TFO at the beginning of demagnetization time TDIS greatly helps improve power conversion efficiency because $R_{DS\text{-}ON}$, the ON resistance of rectifier switch NS, is at its lowest during fully-ON time TFO to conduct large channel current ID, so as to reduce the conduction loss caused by rectifier switch NS.

Regulation time TR following fully-ON time TFO pulls gate signal $V_G$ low in advance, as shown in FIG. 3. Therefore, at the moment t3 when OFF controller 110 finds channel voltage $V_D$ has become positive, OFF controller 110 could rapidly further pull gate signal $V_G$ down to 0V to turn rectifier switch NS OFF, so channel current ID will not become too negative.

The duration of fully-ON time TFO is adaptively adjusted based on the performance record generated during regulation time TR. If regulation time TR is too long, fully-ON time TFO would be too short, suffering power conversion efficiency. If regulation time TR is too short, rectifier switch NS might not be turned OFF quickly enough, risking in large reverse current of rectifier switch NS. Therefore, adaptive adjustment to the duration of fully-ON time TFO helps generate suitable regulation time TR, so power conversion efficiency is improved without the risk of slow turning-OFF to rectifier switch NS.

While the present disclosure has been described by way of example and in terms of preferred embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectifier controller for controlling a rectifier switch, comprising:
   a fully-ON controller, detecting a channel voltage of the rectifier switch, and turning the rectifier switch fully ON for a fully-ON time based on a predetermined criterion; and
   a regulator, disabled during the fully-ON time and enabled after the fully-ON time, to turn the rectifier switch partially ON and regulate the channel voltage within a predetermined voltage range;
   wherein a performance record is generated when the regulator regulates the channel voltage, and the fully-ON controller adjusts the predetermined criterion in response to the performance record.

2. The synchronous rectifier controller as claimed in claim 1, wherein the regulator is enabled for a regulation time after the fully-ON time, the predetermined voltage range is between two boundary voltages, the performance record is an intersection number counting a number of times the channel voltage touches at least one of the boundary voltages, and the fully-ON controller adjusts the predetermined criterion in response to the intersection number during the regulation time.

3. The synchronous rectifier controller as claimed in claim 2, wherein the regulator includes a logic circuit composed of several logic gates, a first current source, and a second current source; the first current source causes the channel voltage to rise, and the second current source causes the channel voltage to drop; during the regulation time, the logic circuit controls one of the first current source and the second current source coupled to the rectifier switch, and the other one of the first current source and the second current source simultaneously isolated from the rectifier switch.

4. The synchronous rectifier controller as claimed in claim 2, wherein the synchronous rectifier controller generates a gate signal to control the rectifier switch, and the synchronous rectifier controller further includes an OFF controller; during the fully-ON time, the fully-ON controller pulls up the gate signal to keep the rectifier switch fully ON; during the regulation time, the regulator alternatively pulls up or pulls down a voltage of the gate signal to keep the rectifier switch partially ON; when the channel voltage is greater than a predetermined voltage, the OFF controller pulls down the gate signal to keep the rectifier switch OFF.

5. The synchronous rectifier controller as claimed in claim 2, wherein the fully-ON controller adjusts the predetermined criterion to make the intersection number approach a predetermined number.

6. The synchronous rectifier controller as claimed in claim 5, wherein when the intersection number is greater than the predetermined number, the fully-ON controller increases the fully-ON time, and when the intersection number is less than the predetermined number, the fully-ON controller decreased the fully-ON time.

7. The synchronous rectifier controller as claimed in claim 1, wherein the fully-ON time is in association with a demagnetization time and a ratio, and the fully-ON controller adjusts the ratio in response to the performance record.

8. The synchronous rectifier controller as claimed in claim 7, wherein the fully-ON time is approximately equal to a product of the demagnetization time and the ratio, wherein the predetermined voltage range is between two boundary voltages, the fully-ON controller records the intersection number counting the number of times the channel voltage touches at least one of the boundary voltages during the regulation time, and when the intersection number is greater than a predetermined number, the fully-ON controller increases the ratio.

9. The synchronous rectifier controller as claimed in claim 1, wherein the fully-ON time is in association with the channel voltage and a reference voltage, and the fully-ON controller adjusts the reference voltage in response to the performance record.

10. The synchronous rectifier controller as claimed in claim 9, wherein when the channel voltage is higher than the reference voltage, the fully-ON controller ends the fully-ON time, wherein the predetermined voltage range is between two boundary voltages, the fully-ON controller records the intersection number counting the number of times the channel voltage touches at least one of the boundary voltages during the regulation time, and when the intersection number is greater than a predetermined number, the fully-ON controller increases the reference voltage.

11. A control method in use of a synchronous rectifier controller controlling a rectifier switch, comprising:
turning the rectifier switch fully ON for a fully-ON time, wherein the fully-ON time is determined based on a predetermined criterion;
regulating for a regulation time, after the fully-ON time, a channel voltage of the rectifier switch within a predetermined voltage range to generate a performance record;
turning the rectifier switch OFF when the channel voltage meets an OFF criterion; and
adjusting the predetermined criterion in response to the performance record, so as to make the performance record approach a predetermined target.

12. The control method as claimed in claim 11, wherein the predetermined voltage range is between two boundary voltages, and the control method comprises:
recording an intersection number counting a number of times the channel voltage touches at least one of the boundary voltages during the regulation time; and
adjusting the predetermined criterion in response to the intersection number.

13. The control method as claimed in claim 12, wherein the synchronous rectifier controller generates a gate signal to control the rectifier switch, and regulating the channel voltage for the regulation time comprises the synchronous rectifier controller alternatively pulling up or pulling down the voltage of the gate signal to keep the rectifier switch partially ON.

14. The control method as claimed in claim 12, wherein the synchronous rectifier controller generates a gate signal to control the rectifier switch, and turning the rectifier switch OFF when the channel voltage meets an OFF criterion comprises the synchronous rectifier controller pulling down the gate signal to a second voltage to keep the rectifier switch OFF when the channel voltage is greater than a predetermined voltage.

15. The control method as claimed in claim 12, wherein the predetermined criterion is adjusted to make the intersection number approach a predetermined number.

16. The control method as claimed in claim 15, wherein when the intersection number is greater than the predetermined number, the fully-ON time is increased, and wherein when the intersection number is less than the predetermined number, the fully-ON time is decreased.

17. The control method as claimed in claim 11, wherein the predetermined criterion is in association with a demagnetization time and a ratio, and the control method adjusts the ratio in response to the performance record.

18. The control method as claimed in claim 17, wherein the fully-ON time is approximately equal to a product of the demagnetization time and the ratio, wherein the predetermined voltage range is between two boundary voltages, the control method comprising:
recording the intersection number counting the number of times the channel voltage touches at least one of the boundary voltages when the channel voltage is regulated within the predetermined voltage range, and
increasing the ratio when the intersection number is greater than a predetermined number.

19. The control method as claimed in claim 11, wherein the predetermined criterion is in association with the channel voltage and a reference voltage, and the control method adjusts the reference voltage in response to the performance record.

20. The control method as claimed in claim 19, wherein when the channel voltage is higher than the reference voltage, the fully-ON time ends, wherein the predetermined voltage range is between two boundary voltages, the control method comprising:
recording the intersection number counting the number of times the channel voltage touches at least one of the boundary voltages when the channel voltage is regulated within the predetermined voltage range, and
increasing the reference voltage when the intersection number is greater than a predetermined number.

* * * * *